(12) United States Patent
Savitz

(10) Patent No.: US 8,198,853 B2
(45) Date of Patent: Jun. 12, 2012

(54) MOTOR SPEED CONTROLLER

(75) Inventor: George Savitz, New Bern, NC (US)

(73) Assignee: BSH Home Appliances Corporation, Irvine, CA (US)

( * ) Notice: Subject to any disclaimer, the term of this patent is extended or adjusted under 35 U.S.C. 154(b) by 429 days.

(21) Appl. No.: 12/248,378

(22) Filed: Oct. 9, 2008

(65) Prior Publication Data

US 2010/0090637 A1    Apr. 15, 2010

(51) Int. Cl.
*H02P 1/46* (2006.01)

(52) U.S. Cl. ............. 318/772; 318/400.35; 318/400.34; 318/400.33; 318/400.32; 318/400.16; 318/400.26; 318/400.24; 318/400.36

(58) Field of Classification Search .................. 318/772, 318/599, 727, 799, 801, 802, 400.34, 400.32, 318/400.35, 400.33, 400.16, 400.23, 400.26, 318/400.24, 400.36, 494, 443, 102, 444, 318/767, 144, 750, 756

See application file for complete search history.

(56) References Cited

U.S. PATENT DOCUMENTS

| | | | |
|---|---|---|---|
| 3,719,137 A | | 3/1973 | Gould |
| 3,818,297 A | * | 6/1974 | Ha et al. .................. 388/809 |
| 3,961,152 A | | 6/1976 | Staats |
| 4,013,859 A | | 3/1977 | Peters, Jr. |
| 4,109,306 A | | 8/1978 | Mason |
| 4,151,387 A | | 4/1979 | Peters, Jr. |
| 4,400,654 A | | 8/1983 | Elliott |
| 4,409,533 A | | 10/1983 | Kawabata |
| 4,490,596 A | | 12/1984 | Hirai et al. |
| 4,675,586 A | * | 6/1987 | Eigner et al. .................. 318/458 |
| 4,789,834 A | | 12/1988 | Koopman |
| 4,996,470 A | * | 2/1991 | Rowan et al. ................. 318/772 |
| 5,015,827 A | | 5/1991 | Kadwell et al. |
| 5,075,613 A | * | 12/1991 | Fisher ........................ 318/809 |
| 5,200,684 A | * | 4/1993 | Fisher ........................ 318/809 |
| 5,402,053 A | * | 3/1995 | Divan et al. .................. 318/768 |
| 5,408,073 A | | 4/1995 | Jeong |
| 5,440,219 A | | 8/1995 | Wilkerson |
| 5,448,141 A | | 9/1995 | Kelley et al. |
| 5,506,487 A | * | 4/1996 | Young et al. .................. 318/811 |
| 5,517,095 A | * | 5/1996 | Carobolante et al. .... 318/400.35 |
| 5,629,598 A | * | 5/1997 | Wilkerson ...................... 318/808 |
| 5,650,923 A | | 7/1997 | Suzuki et al. |
| 5,811,946 A | * | 9/1998 | Mullin et al. ................. 388/811 |
| 5,828,563 A | | 10/1998 | Suzuki et al. |
| 5,838,127 A | | 11/1998 | Young et al. |
| 5,847,524 A | | 12/1998 | Erdman et al. |
| 6,046,554 A | * | 4/2000 | Becerra .................... 318/400.34 |
| 6,081,091 A | * | 6/2000 | Mitchell et al. .............. 318/685 |
| 6,147,465 A | | 11/2000 | Hollenbeck |
| 6,215,261 B1 | | 4/2001 | Becerra |
| 6,275,400 B1 | | 8/2001 | Ó Bréartúin |
| 6,459,230 B1 | * | 10/2002 | Tao ........................... 318/798 |
| 6,498,446 B1 | * | 12/2002 | Menegoli et al. ........ 318/400.12 |
| 6,600,139 B2 | | 7/2003 | Perschl et al. |
| 6,657,346 B2 | | 12/2003 | Pan et al. |

(Continued)

*Primary Examiner* — Rita Leykin

(74) *Attorney, Agent, or Firm* — James E. Howard; Andre Pallapies

(57) ABSTRACT

A motor speed controller and a method of controller a speed of a motor are provided. The system and method include a motor and a motor controller that monitors operation of the motor based on electromotive force (EMF) conditions of the motor. The motor controller cuts a voltage to the motor, measures an electromotive force (EMF) of the motor at a predetermined time after the cutting of the voltage to the motor, and compares the measured electromotive force (EMF) to a table.

33 Claims, 13 Drawing Sheets

U.S. PATENT DOCUMENTS

| | | | |
|---|---|---|---|
| 6,762,575 B2 * | 7/2004 | Douglas | 318/400.34 |
| 6,801,004 B2 | 10/2004 | Frankel et al. | |
| 6,805,312 B2 | 10/2004 | Capp | |
| 6,850,252 B1 | 2/2005 | Hoffberg | |
| 6,866,202 B2 | 3/2005 | Sigafus et al. | |
| 6,894,454 B2 * | 5/2005 | Patel et al. | 318/700 |
| 6,913,012 B2 | 7/2005 | Divett et al. | |
| 6,919,815 B2 | 7/2005 | Peterson | |
| 6,969,287 B1 | 11/2005 | Motsenbocker | |
| 7,109,448 B2 | 9/2006 | Goranson | |
| 7,148,642 B2 | 12/2006 | Brannen et al. | |
| 7,183,734 B2 * | 2/2007 | Lassen | 318/400.34 |
| 7,279,865 B2 | 10/2007 | Matsuo | |
| 7,293,718 B2 | 11/2007 | Sigafus et al. | |
| 7,301,298 B2 * | 11/2007 | Shao et al. | 318/599 |
| 7,309,846 B2 | 12/2007 | Haberkamm et al. | |
| 7,335,071 B1 | 2/2008 | Motsenbocker | |
| 7,348,754 B2 | 3/2008 | Prasanna | |
| 2003/0030408 A1 * | 2/2003 | Ratz et al. | 318/772 |
| 2003/0172919 A1 | 9/2003 | Rabas et al. | |
| 2003/0234624 A1 | 12/2003 | Frankel et al. | |
| 2004/0079355 A1 | 4/2004 | Divett et al. | |
| 2005/0092314 A1 | 5/2005 | Rabas et al. | |
| 2005/0224068 A1 | 10/2005 | Kim et al. | |
| 2005/0236389 A1 | 10/2005 | Goranson | |
| 2006/0278216 A1 | 12/2006 | Gagas et al. | |
| 2007/0023420 A1 | 2/2007 | Gagas | |
| 2007/0062513 A1 | 3/2007 | Gagas | |
| 2007/0145032 A1 | 6/2007 | Graham et al. | |
| 2007/0221199 A1 | 9/2007 | Hake et al. | |
| 2010/0019710 A1 * | 1/2010 | Schwarzkopf et al. | 318/400.35 |

* cited by examiner

MOTOR SPEED CONTROLLER

REFERENCE TO CO-PENDING APPLICATION FOR PATENT

The present application for patent is related to the following co-pending U.S. patent application: "HOUSEHOLD APPLIANCE INCLUDING A MOTOR SPEED CONTROLLER" by George Savitz, 12/248,417, filed concurrently herewith, assigned to the assignee hereof, and expressly incorporated by reference herein.

FIELD OF DISCLOSURE

The present invention relates to a motor controller, and a method of controlling a motor, and more particularly, to a motor speed controller using electromotive force (EMF) conditions within a motor, and a method of controlling a speed of a motor using EMF conditions within the motor.

BACKGROUND

Many conventional devices incorporate a motor for powering rotational components such as a fan or a pulley drive. The conventional motors may be single speed or two speed motors. The cost of the motor commonly is an important consideration in selecting an appropriate motor for a particular device or application. For example, a conventional two speed motor has two windings, and therefore, commonly is more expensive than a single speed motor. The added cost of the two speed motor may result in an increase in manufacturing costs associated with the device.

In many conventional devices, there is a need to monitor and control the speed of the motor, for example, to maintain a constant speed or to detect a failure or slowing of the motor below a predetermined or threshold speed. An integrated Hall effect sensor or device can be used to determine the speed of the motor by directly measuring the rotational speed of the motor. However, the added cost of the Hall effect sensor or device may further increase the manufacturing costs associated with the device.

SUMMARY

The present invention recognizes that there is a need for an inexpensive, sensorless motor controller that determines the speed of the motor, for example, to detect a failure or slowing of the motor below a predetermined or threshold speed. The present invention further recognizes that the Hall effect sensors used in many conventional systems may increase the number of parts and the cost of the motor. The present invention further recognizes that there is a need to provide an inexpensive two speed motor and motor controller for a two speed motor that minimizes or reduces an amount of noise experienced by a user during operation of the motor.

To solve the problems with the conventional motors, the present invention provides a sensorless motor controller for controlling an AC inductive motor (e.g., AC single-pole or shaded-pole motor). The invention provides an important advantage of reducing costs, for example, because an AC single-phase inductive motor may be less expensive than two or three phase motors that commonly have been used in many conventional systems. Such AC inductive motors also may provide low torque and may be easily defined.

The present invention also eliminates the need for a Hall effect sensor to monitor and control the speed of the motor. The present invention provides a sensorless motor controller for controlling an AC inductive motor using the electromotive force (EMF) conditions within the motor, and a method of real time motor speed control and detection using the EMF conditions within the motor. The EMF conditions may provide adequate speed sensing and control without requiring an additional sensor, such as a Hall effect sensor. The present invention provides an inexpensive motor control that determines, for example, the speed of the motor, whether the motor is operating at a minimum speed (i.e., threshold speed), or whether the motor is operating at all. The present invention provides important advantages of reducing the number of parts and reducing the costs associated with the motor and motor control.

More particularly, the present invention recognizes that an inductive motor may change voltage instantly, but cannot change current instantly. Therefore, each time the motor is cut off (i.e., power is cut off), an inductive spike results. The present invention further recognizes that the EMF is dependent on the speed of the motor at the time the motor is cut off. The present invention takes advantage of these characteristics to provide a sensorless motor speed controller for an AC inductive motor that is inexpensive and easy to monitor and control.

The present invention provides a sensorless motor speed controller that easily detects the speed of the motor, for example, to detect a failure or slowing of the motor below a predetermined or threshold speed. For example, an aspect of the invention operates an AC inductive single-phase or shaded-pole motor, cuts the voltage of the motor for a short period of time, and then measures the amplitude of the back feed voltage or back EMF at a predetermined point in time. The measured back EMF may then be compared to a look-up table to determine the speed of the motor and an evaluation performed to determine whether the speed of the motor is less than a predetermined or threshold value. If the speed of the motor is equal to or greater than the predetermined or threshold value, then the motor controller may supply a signal indicating that the motor is operating properly each time the speed is evaluated. If the speed of the motor is less than the predetermined or threshold value, then the motor controller may supply a signal indicating that the motor is operating improperly.

The present invention further provides an inexpensive AC inductive motor (e.g., a shaded-pole or single-phase motor) having two speeds that is easily manufactured and easily monitored and controlled.

The present invention recognizes that the trend in motor control design is to provide an ever increasing amount of control of the motor at every moment in time. The conventional motor control designs strive to increase the amount of control for smaller and smaller increments of time. In stark contrast, the present invention diverges from the accepted wisdom in conventional devices and methods and provides periodic motor control instead of continuous motor control at every point in time. That is, the present invention recognizes that periodic motor control may provide important advantages and that instantaneous feedback may not be needed or desirable for providing motor control in many applications. The present invention may provide periodic motor control by cutting the power to the motor periodically (e.g., every 20 seconds, 30, seconds, 1 minute, etc.). By cutting the power periodically, the present invention may provide important advantages such a dampening noise and saving costs, such as operating costs.

The embodiments of the present invention provide important advantages over the conventional devices and methods, for example, by providing an inexpensive and sensorless AC inductive motor control (e.g., AC single-phase or shaded-pole motor) that dynamically controls the speed of the motor and improves the safety of the operation of the motor.

In view of the above aspects of the invention, an exemplary embodiment is directed to a method of controlling a motor. The method includes cutting a voltage to the motor, measuring an electromotive force (EMF) of the motor at a predetermined time after the cutting of the voltage to the motor, and comparing the measured electromotive force (EMF) to a table.

In other embodiments, the motor can be an AC inductive motor. The table can be a software table or database. The table can be specific to the motor being used. The table can include a threshold value. The threshold value can include a first threshold for a high speed mode and a second threshold for a low speed mode. The threshold value can be based on an application of the motor.

In an embodiment, the method includes determining whether the motor was running at a time of the cutting of the voltage to the motor based on the comparison of the measured electromotive force (EMF) to the table, determining a speed of the motor at a time of the cutting of the voltage to the motor based on the comparison of the measured electromotive force (EMF) to the table, and/or determining whether the motor is operating below a predetermined or threshold value at a time of the cutting of the voltage to the motor based on the comparison of the measured electromotive force (EMF) to the table.

In an embodiment, the method includes outputting a first signal indicating that the motor is operating properly if the operation of the motor is equal to or greater than the predetermined or threshold value, or outputting a second signal indicating that the motor is operating improperly if the operation of the motor is less than the predetermined or threshold value. In an embodiment, the first signal is a first Hall effect mimicking signal, and the second signal is a second Hall effect mimicking signal. In an embodiment, the method includes sending a signal to default the motor to a high speed setting based on the outputting of the second signal. In an embodiment, the method includes turning the voltage to the motor back on. In an embodiment, the voltage is periodically cut and turned back on, and the electromotive force (EMF) is measured during periods when the voltage is cut. In an embodiment, the method includes turning the voltage to the motor back on based on the outputting of the first signal. In an embodiment, the method includes setting a timer upon turning the voltage to the motor back on, and re-cutting the voltage to the motor after the timer has expired. In an embodiment, a microcontroller performs the comparing of the measured electromotive force (EMF) to the table, and the method includes normalizing the measured electromotive force (EMF) of the motor to be within an operating range of a microcontroller. In an embodiment, the method includes powering the motor in a full-on state to provide a high speed mode, and cutting a leading edge of a power signal to the motor to reduce an amount of on-time of the motor and provide a low speed mode.

Another exemplary embodiment is directed to a method of controlling a motor. The method includes periodically cutting a voltage to the motor, measuring an electromotive force (EMF) of the motor at a predetermined period of time after the cutting of the voltage to the motor, and comparing the measured electromotive force (EMF) to a table to determine if the motor is operating properly. If the motor is determined to be operating properly, the method includes outputting a first signal and turning the voltage to the motor back on. If the motor is determined to be operating improperly, the method includes outputting a second signal indicating that the motor is operating improperly.

Another exemplary embodiment is directed to a sensorless motor speed controller system. The system includes a motor, and a motor controller that monitors operation of the motor based on electromotive force (EMF) conditions of the motor. In an embodiment, the motor is an AC inductive motor. The motor controller cuts a voltage to the motor, measures an electromotive force (EMF) of the motor during a motor off time, and compares the measured electromotive force (EMF) to a table. In another embodiment, the motor controller includes a speed sensing module that measures the electromotive force (EMF) of the motor, a microcontroller that receives the measured electromotive force (EMF) from the speed sensing module and compares the measured electromotive force (EMF) to a table. The table can be a software table or database. In another embodiment, the speed sensing module normalizes the measured electromotive force (EMF) of the motor to be within an operating range of the microcontroller. In another embodiment, the motor controller determines one of whether the motor was running based on the electromotive force (EMF) conditions of the motor, a speed of the motor based on the electromotive force (EMF) conditions of the motor, and whether the motor was operating below a predetermined or threshold value based on the electromotive force (EMF) conditions of the motor. In another embodiment, the motor controller outputs a first signal indicating that the motor is operating properly if the electromotive force (EMF) conditions of the motor are equal to or greater than a predetermined or threshold value. In another embodiment, the motor controller outputs a second signal indicating that the motor is operating improperly if the electromotive force (EMF) conditions of the motor are less than a predetermined or threshold value. In another embodiment, the AC inductive motor is a two-speed AC inductive motor. In another embodiment, the motor is coupled to a rotational device.

Another exemplary embodiment is directed to a sensorless motor speed controller that monitors operation of a motor based on electromotive force (EMF) conditions of the motor. The sensorless motor speed controller includes a microcontroller that cuts a voltage to the motor, and a speed sensing module that measures the electromotive force (EMF) of the motor at a time when the voltage is cut. The microcontroller receives the measured electromotive force (EMF) from the speed sensing module and compares the measured electromotive force (EMF) to a table.

In another embodiment, the motor is an AC inductive motor. The table can be a software table or database. In another embodiment, the speed sensing module normalizes the measured electromotive force (EMF) of the motor to be within an operating range of the microcontroller. In another embodiment, the motor controller determines one of whether the motor was running based on the electromotive force (EMF) conditions of the motor, a speed of the motor based on the electromotive force (EMF) conditions of the motor, and whether the motor was operating below a predetermined or threshold value based on the electromotive force (EMF) conditions of the motor.

The features of the invention, however, together with additional objects and advantages thereof will be best understood from the following description of exemplary embodiments when read in connection with the accompanying drawings.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

With reference to FIGS. 1-13, exemplary embodiments of the invention will now be described.

Figure 1:
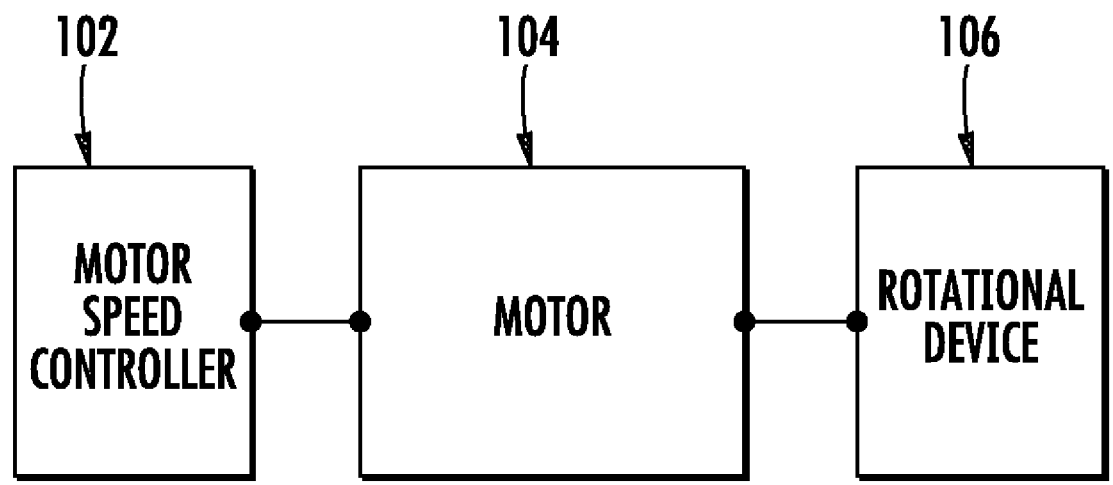
FIG. 1 is a schematic illustrating a motor control system according to an embodiment of the invention.

FIG. 1 illustrates an embodiment of a motor control system 10 having a motor speed controller 102. The motor speed controller 102 communicates with a motor 104 that is rotatably coupled to a rotational device 106, such as a fan having fan blades or impellers, a pulley drive, etc. The motor speed controller 102 drives the motor 106.

The motor 104 according to an embodiment may be an AC inductive motor (i.e., AC shaded-pole or single-phase motor). The motor speed controller 102 communicates with the motor 104. The motor speed controller 102 may include a microcontroller for controlling the speed of the motor 104. One of ordinary skill in the art will recognize that any suitable microcontroller may be utilized to provide the functionality described herein.

The motor speed controller 102 can provide real time motor speed control and detection using the inherent EMF properties of an AC inductive motor to provide a fully sensorless motor control. The speed detection is performed using the electromotive force (EMF) conditions within the motor 104. More particularly, the speed detection is performed by measuring the EMF conditions within the motor 104 during motor OFF times.

The embodiments are described in general with respect to a motor control, a motor control for a household appliance such as a cooking appliance, and a motor control for a pulley drive. However, one of ordinary skill in the art will recognize that the embodiments are not limited to these examples and may include any device that incorporates a motor. For example, the embodiments are applicable to any household appliance having a fan, such as a wall oven, range/oven, convection oven, cooktop, or similar household appliance. The embodiments also are applicable to other household appliances or devices, such as a space heater, an air vent (e.g., exhaust vent or bathroom vent), a cabinet cooling fan for a personal computer, a laptop, a portable computing device, a server cabinet, etc., as well as microwaves, refrigerators, dishwashers, dryers, washing machines, etc. The embodiments also can provide for sensing a motor speed for a pulley drive, for example, in a household appliance, such as a washing machine. The embodiments can provide for sensing a motor speed for a rack and pinion drive or other translational mechanisms or devices.

For example, the motor speed controller may be applicable to a household appliance 10, and more particularly, a cooking appliance such as a built-in wall oven, a cooktop, a range/oven, a convection oven, a refrigerator, a freezer, or a microwave cooking appliance. The motor speed controller embodiments are not limited to application to household appliances such as a cooking appliance or a refrigeration appliance, and may include any household appliances having a fan, including but not limited to a space heater, an air vent (e.g., exhaust vent or bathroom vent), a cabinet cooling fan for a personal computer, a laptop, a portable computing device, a server cabinet, etc., as well as microwaves, refrigerators, dishwashers, dryers, washing machines, etc. The embodiments also are not limited to household appliances having an interior cavity, and may include household appliances without an enclosed interior cavity, such as an exhaust hood that draws air into an inlet and exhausts air out an outlet to the exterior. The embodiments also are applicable for controlling a motor and sensing a motor speed for a pulley drive, for example, in a household appliance, such as a washing machine or dryer. The embodiments can provide for controlling a motor and sensing a motor speed for a rack and pinion drive or other translational mechanisms or devices.

Figure 2:
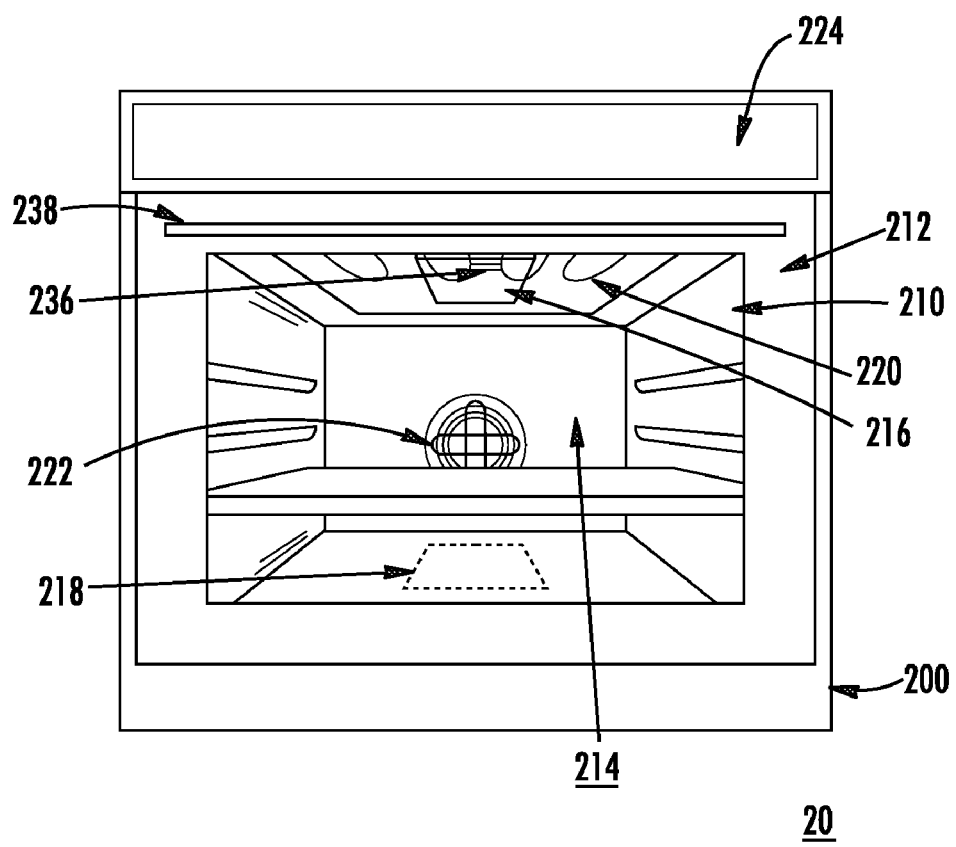
FIG. 2 is a schematic illustrating a household appliance including a motor control system according to an embodiment of the invention.
Figure 3:
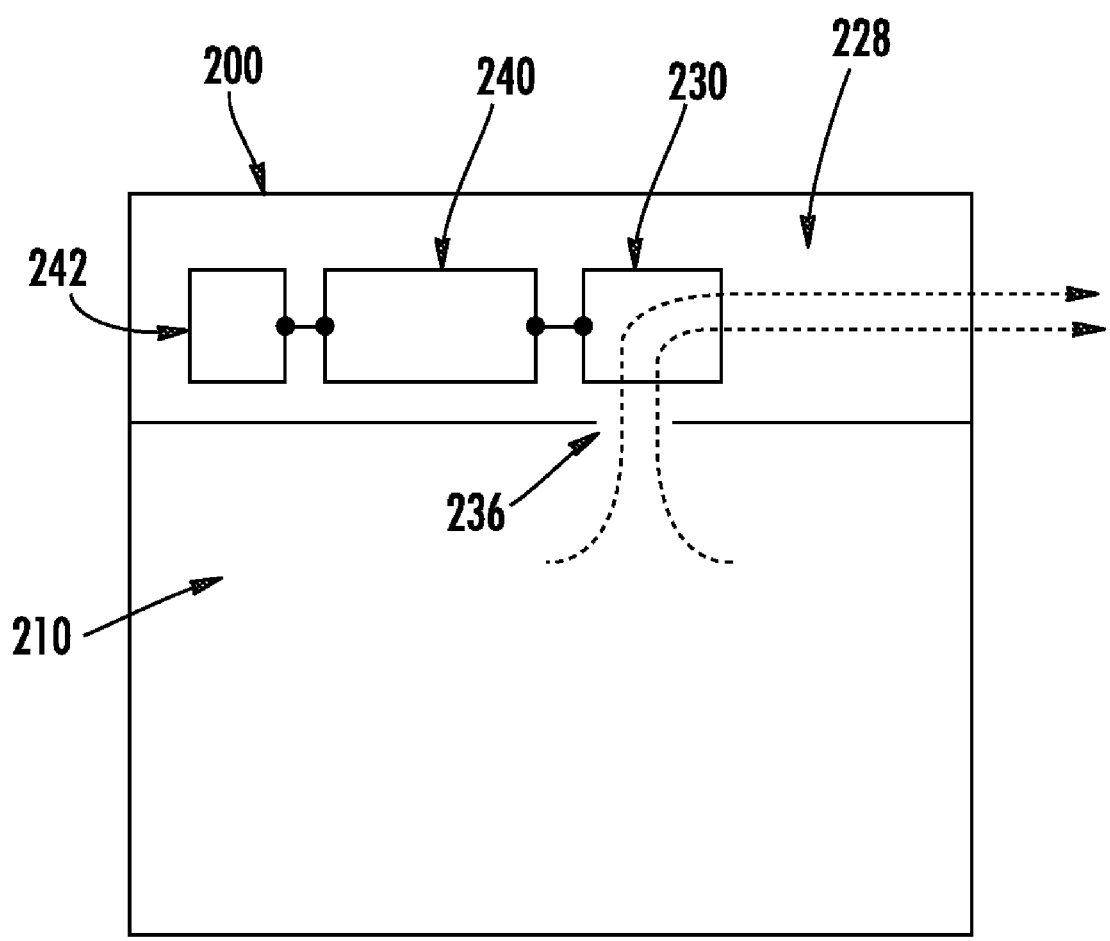
FIG. 3 is another schematic illustrating the household appliance shown in FIG. 2.

With reference to FIGS. 2 and 3, an exemplary embodiment of motor speed controller may control a fan motor for a household appliance, such as a cooking appliance 20 (e.g., a domestic wall oven), will now be described.

As shown in FIG. 2, the cooking appliance 20 includes a baking oven housing 200, in which a cooking area 210 is arranged. The cooking area 210 can be sealed with a swivel-mounted door 212 having a door handle 238. The cooking area 210 can be heated with a heating unit 214, which may have a heating element 216 in the top region for top heating, a heating element 218 in the floor region for bottom heating, and a heating spiral 220 for grilling in the top region. The cooking appliance 20 has a control panel 224 with one or more control elements for setting temperatures of one or more of the heating elements, setting different types of cooking modes, and/or timing the cooking operation, etc. The cooking appliance 20 may include a circulating fan 222 in the rear region of the cooking area 210 for generating an air current for a circulating mode.

With reference to FIG. 3, the cooking appliance 20 may include a cooling fan or exhaust fan 230, which has fan blades or impellers. In the embodiment, the cooling fan 230 is rotatably coupled to an electrically operated motor 240. The cooling fan 230 may be arranged outside of the cooking area 210 and in communication with a cavity 228 of the baking oven housing 200. The cooling fan 230 may be located at a variety of locations depending on the design of the appliance. For example, the cooling fan 230 may be located above the cooking area, at the rear side of the appliance, and/or in the cavity 228. The purpose of the cooling fan 230 may be to convey air out of the cooking area 210 to the exterior of the cooking appliance 20. To this end, the cooling fan 230 suctions air through an opening 236 in the top region of the cooking area 210 and conveys the air through a channel system (not shown in detail) to a blower aperture (not shown) in the baking oven housing 200 or in the swivel-mounted door 212. The blower aperture may exhaust directly to the exterior of the cooking appliance 20 or to an exhaust duct for channeling air to another location, such as an exterior of a home.

As shown in FIG. 3, the cooling fan 230 is rotatably coupled to a motor 240, which communicates with a motor speed controller 242. In an embodiment, the circulating fan 222 also may be rotatably coupled to a motor that communicates with a motor speed controller 242. In this embodiment, the motor 240 is an AC inductive motor.

With reference to FIGS. 1-4, an exemplary method of controlling an AC inductive motor according to an embodiment of the invention will now be described. As explained above, the exemplary motor speed controller 102, 242 can provide real time motor speed control and detection using the inherent EMF properties of an AC inductive motor (e.g., 104, 240) to provide a fully sensorless motor control.

Figure 4:
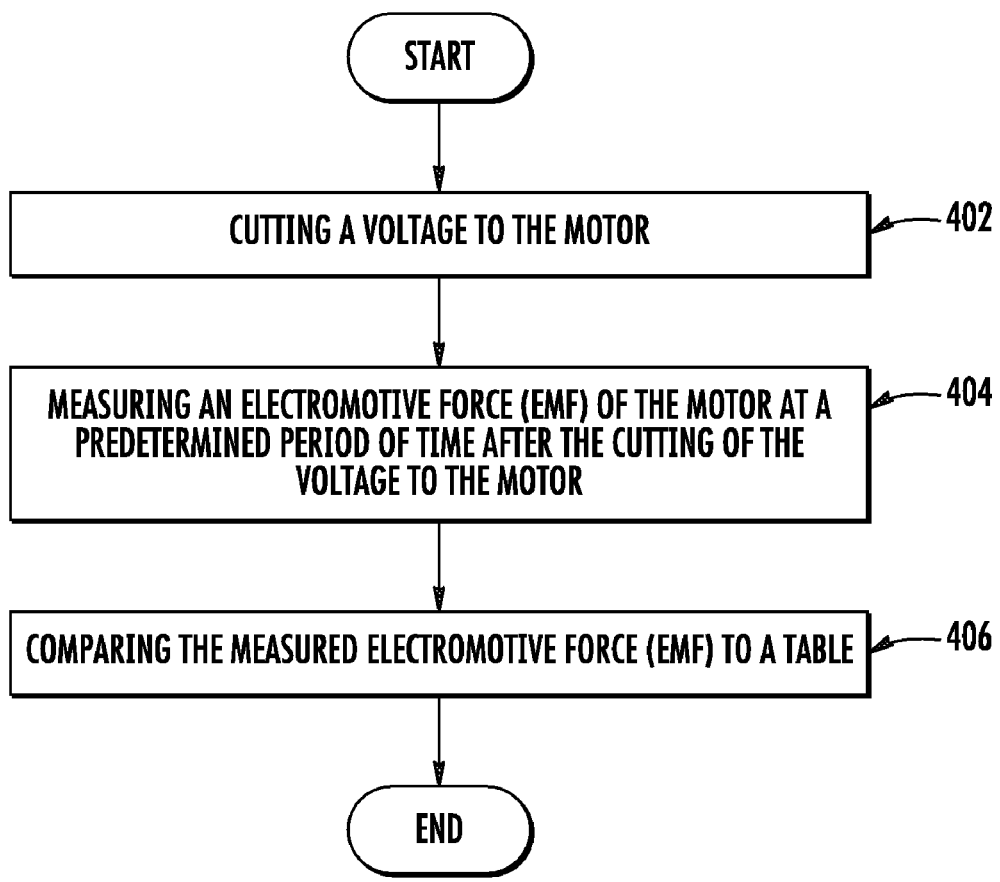
FIG. 4 is a flow diagram illustrating a method of controlling a household appliance fan according to an embodiment of the invention.

As shown in FIG. 4, the motor speed control method includes cutting a voltage to the motor (402). In an embodiment, the motor is an AC inductive motor. Next, the method includes measuring an electromotive force (EMF) (e.g., an amplitude of the EMF) of the motor at a predetermined period of time after cutting the voltage to the motor (404). The predetermined amount of time after cutting the voltage to the motor may be based on one or more factors. For example, the amount of time may be based on the time needed for inductive oscillations to dampen after the voltage to the motor is cut. The amount of time may be based on the speed setting of the motor (e.g., low speed or high speed) at the time the voltage to the motor is cut. The EMF may be measured or captured at a predetermined time that provides the greatest EMF (i.e., the strongest or 'best' time point, or the point with the greatest rate of change of EMF) for a particular motor being used or a particular application. Since the EMF may vary based on the motor, the amount of time may be based on the particular motor being used. One of ordinary skill in the art will recognize that one or more of the aforementioned factors, as well as other factors, may be taken into consideration in determining the predetermined amount of time to be used.

Figure 6:
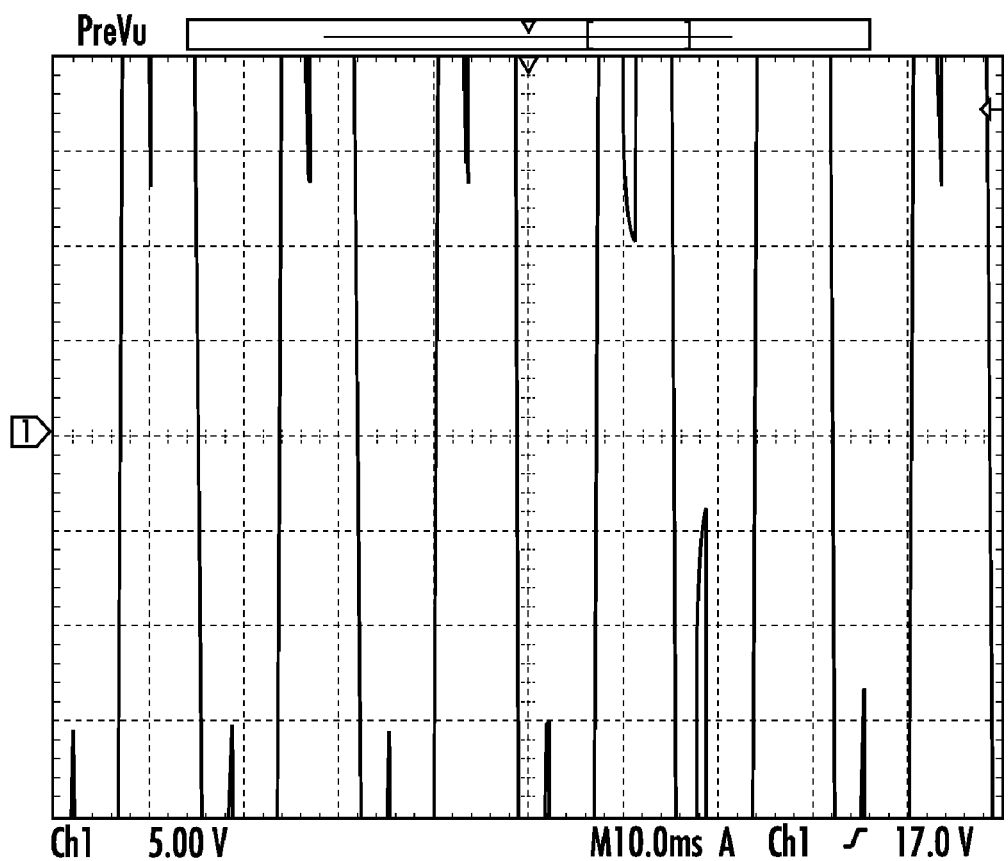
FIG. 6 is a screen shot illustrating a slow speed reading according to an embodiment of the invention.

For example, as shown in FIG. 6, which will be described in greater detail below, the greatest rate of change or difference in EMF occurs in the first 4 ms for the particular motor in this example. Thus, in this example, for an AC inductive motor being operated at 120 V, the predetermined time may be selected to cut the voltage to the motor for a short period of time, such as 4 ms. In an exemplary embodiment, the method senses the line crossing and then physically cuts the power to the motor at an interval, such as 3.5 ms or 4 ms of OFF time, takes an EMF reading or measurement, and then turns the voltage to the motor back on.

Referring again to FIG. 4, the measured EMF is then compared to a table (406). In an embodiment, the comparison of the EMF to the table can be used to determine the speed of the motor at the time the voltage to the motor was cut off. In another embodiment, the comparison can be used to evaluate whether the speed of the motor was less than a predetermined or threshold value (e.g., a minimum value) at the time the voltage to the motor was cut off. In another embodiment, the comparison can be used simply to determine whether the motor was running or operating at the time the voltage to the motor was cut off. The embodiments provide important advantages in that the EMF conditions can provide adequate speed sensing and control for many applications in a cost-effective manner.

The table may be a look-up table, such as a software look-up table, a database, etc. The table may be based on one or more factors, such as the particular motor being used, the particular motor or type of rotational device being powered, or the particular application of the motor and rotational device, among other things. In an embodiment, the look-up table may include one or more threshold values. For example, the look-up table may include a minimum threshold speed at which the motor is capable of satisfying the operating requirements of the device. The minimum speed can be, for example, the speed at which the motor properly or safely rotates the rotational device for the particular device in which it is being used. In another embodiment, the threshold values may be based on an operating mode of the motor or rotational device. For example, the look-up table may include a first threshold for a high speed mode, and/or a second threshold for a low speed mode. In other embodiments, the threshold value may be based on the operational requirement of the particular rotational device, such as the air flow or the air speed requirements for proper operation of a fan or a pulley drive, or a particular cycle of a device including a fan or a pulley device.

Figure 5:
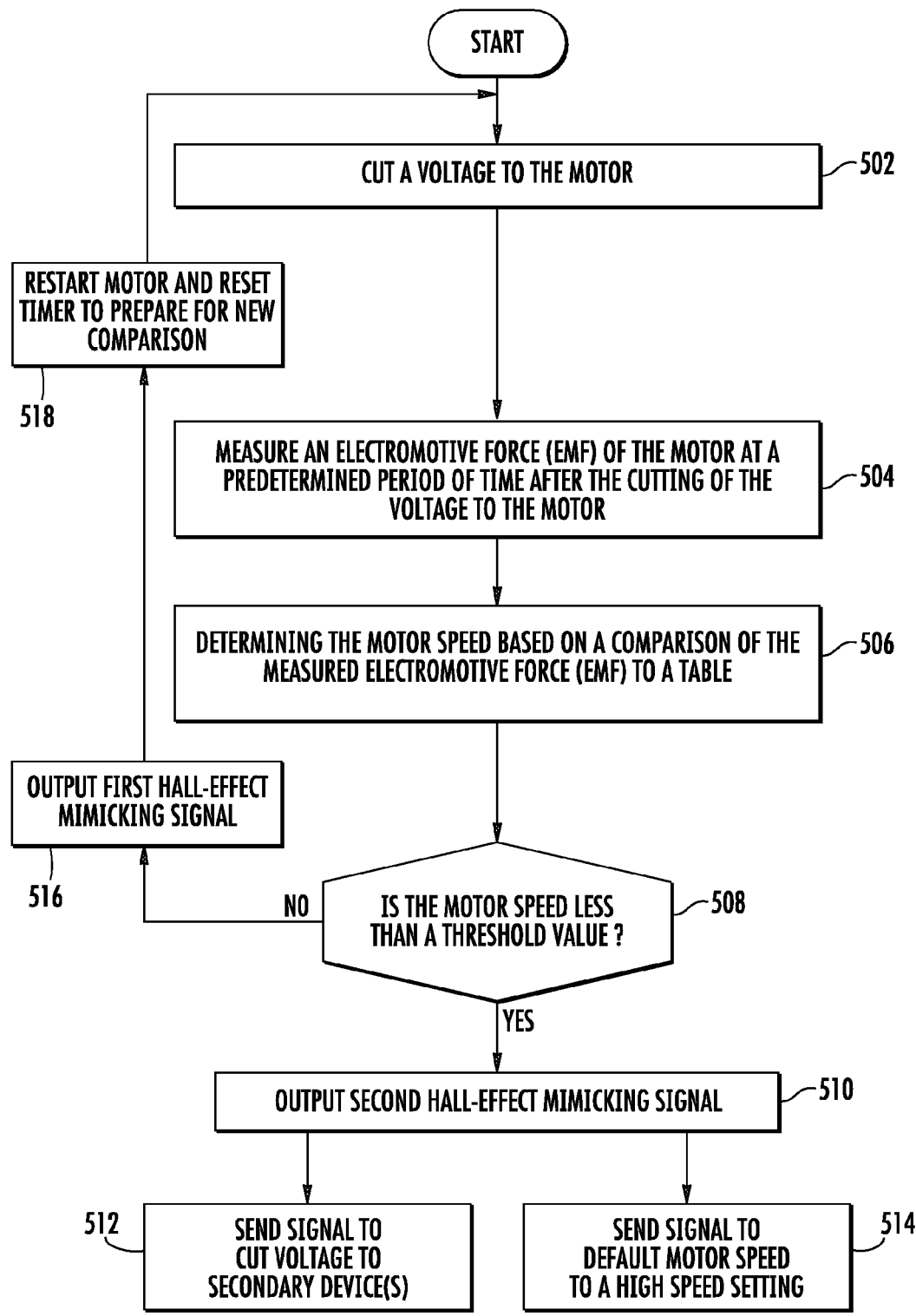
FIG. 5 is a flow diagram illustrating a method of controlling a household appliance fan according to an embodiment of the invention.

With reference to FIG. 5, an exemplary method of controlling an AC inductive motor of an appliance, such as a cooking appliance, will now be described. As explained above, the exemplary motor speed controller can provide real time motor speed control and detection using the inherent EMF properties of an AC inductive motor to provide a fully sensorless motor control.

As shown in FIG. 5, the method includes cutting the voltage to the motor (502). The method includes measuring an electromotive force (EMF) of the motor at a predetermined period of time after the cutting of the voltage to the motor (504). The measured EMF then can be compared to a look-up table (506) to determine whether the motor is operating below one or more predetermined or threshold speeds (508). The method can include outputting a first signal indicating that the motor is operating properly if the speed of the motor is equal to or greater than the threshold value (516). The method also can include outputting a second signal indicating that the motor is not operating properly if the speed of the motor is less than a threshold value (510).

The output of the exemplary sensorless motor speed controller can be based on the specific system in which the sensorless motor speed controller is implemented. That is, the embodiments can provide a sensorless motor speed controller that outputs a mimicking signal that mimics a particular signal that the conventional system expects to receive, such as a square output that mimics a signal of a Hall effect sensor that indicates the particular motor speed. As an example, if the conventional system expects to receive an output from a Hall effect sensor, the embodiments can provide a 'black box' control solution that outputs a Hall effect mimicking signal. If the speed readings are within expected limits, then the microcontroller can output a 50% duty cycle square wave where f=expected Hall frequency. If the speed readings are not within expected limits, then the Hall effect mimicking signal can go low to communicate the error. The exemplary embodiments can provide a so-called 'black box' motor speed controller that easily interfaces with the conventional systems of a device with minimal or no modifications to these conventional systems. The embodiments can provide an important advantage of saving costs while minimizing or avoiding a need for modifying the conventional systems that interface with the novel motor speed controller.

In the embodiment of FIG. 5, the first signal is a first Hall effect mimicking signal (516). For example, the first Hall effect mimicking signal can be a 50% duty cycle square wave having a frequency ranging from 24 Hz to 26 Hz. Similarly, the second signal is a second Hall effect mimicking signal, for example, in which the signal goes low to communicate the error in fan operation (510). In other embodiments, the first Hall effect mimicking signal can be a HIGH signal or the like, and the second Hall effect mimicking signal can be a LOW signal or the like, or vice versa.

The embodiments also may provide periodic motor control, which may reduce operating costs, instead of controlling the motor at every point in time, as in the conventional designs. For example, as shown in FIG. 5, if the first Hall effect mimicking signal is output (516), the method can include restarting the motor (i.e., turning the voltage to the motor back on) and/or resetting a timer to prepare for a new comparison (518). The embodiments can provide periodic motor control by cutting the power to the motor (i.e., 502 in FIG. 5) periodically (e.g., every 20 seconds, 30 seconds, 1 minute, etc.). Each time the voltage to the motor is cut off (502), a timer can be reset (518) so that the voltage is cut off periodically for taking the EMF measurements. The time period for periodically cutting of the voltage can be based on one or more factors, such as the particular motor, rotational device being powered, or type of application of the motor and rotational device. Other factors also may be considered. By cutting the power periodically, the present invention may provide important advantages such as reducing or dampening a volume of noise associated with the operation of the motor and saving costs.

As shown in FIG. 5, if the second Hall effect mimicking signal is output (510), the method may send a signal to cut the voltage to a secondary device interacting with the motor (512), or to terminate an operation or cycle of a secondary device interacting with the motor (514). For example, if the motor is powering a fan of a cooking appliance, then the method may send a signal to cut the voltage to the heating elements of the cooking appliance, or to terminate a cooking cycle or self-cleaning cycle of the cooking appliance (512). Additionally or alternatively, if the second Hall effect mimicking signal is output (510), the method may send a signal to cause the motor to default to a high speed setting, for example, to maximize air flow and improve safety (514).

As explained above, the look-up table may include one or more threshold values that are based on an operating mode of the motor. For example, the look-up table may include a first threshold for a high speed mode and/or a second threshold for a low speed mode. With reference again to FIGS. 1-3, the motor speed controller 102, 242 may control the operation of the AC inductive pole motor 104, 240 such that two motor speed settings may be provided. For example, a high speed setting may be provided by powering the motor 104, 240 in a full power or all-on state. A low speed may be provided by cutting the leading edge of the power signal to the motor 104, 240 to reduce an amount of on-time of the motor 104, 240, thereby slowing the speed of the motor 104, 240. The low speed operation may be similar to the operation of a dimmer switch. One of ordinary skill in the art will recognize that this type of operation is not commonly used for controlling AC inductive motors.

For low speed operation, the OFF time of the motor may be extended by an appropriate amount of time (e.g., a predetermined amount of time) to provide sufficient EMF signal settling time. For high speed detection, a minimal synchronized delay may be sufficient to allow for sufficient EMF signal settling time. The OFF time may be selected to avoid sudden "jerks" in the motor speed that may result in customer dissatisfaction, for example, due to motor noise. The OFF time can be selected to minimize or eliminate any sound change that may be perceived by the user of the household appliance.

Referring again to FIGS. 2 and 3, an exemplary embodiment of motor speed controller may control a fan motor for a household appliance, which may be a cooking appliance such as a built-in wall oven. In this embodiment, or similar embodiments, the high speed setting or the low speed setting of the controller may be dependent on an input from an oven control system (e.g., 224). Therefore, an embodiment can provide a fan speed motor controller that acts as a 'black box' to the oven control system. For example, the built-in wall oven control system may employ two relays in an XOR relationship. This configuration commonly is designed for a conventional two winding fan motor to provide power to the individual windings. The exemplary motor speed controller provides an important advantage in that the motor speed controller acts as a 'black box' to the oven control system such that the available 120V relay switching can be used for performing the speed selection.

With reference to FIG. 6, an example of controlling an AC inductive motor operating at a slow speed mode, according to an embodiment of the invention, will now be described. As shown in the screen shot of FIG. 6, the low speed may be provided by cutting the leading edge of the power signal to the motor to reduce an amount of ON time of the motor, thereby slowing the speed of the motor. The exemplary method senses the line crossing (i.e., the voltage crossing the zero line) and then physically cuts the power to the motor. The method takes an EMF reading or measurement approximately 4 ms after the voltage is cut and then turns the voltage to the motor back on. As shown in the embodiment of FIG. 6, the EMF reading for this example is approximately 10 V at a point of time approximately 4 ms after the voltage is cut.

Figure 7:
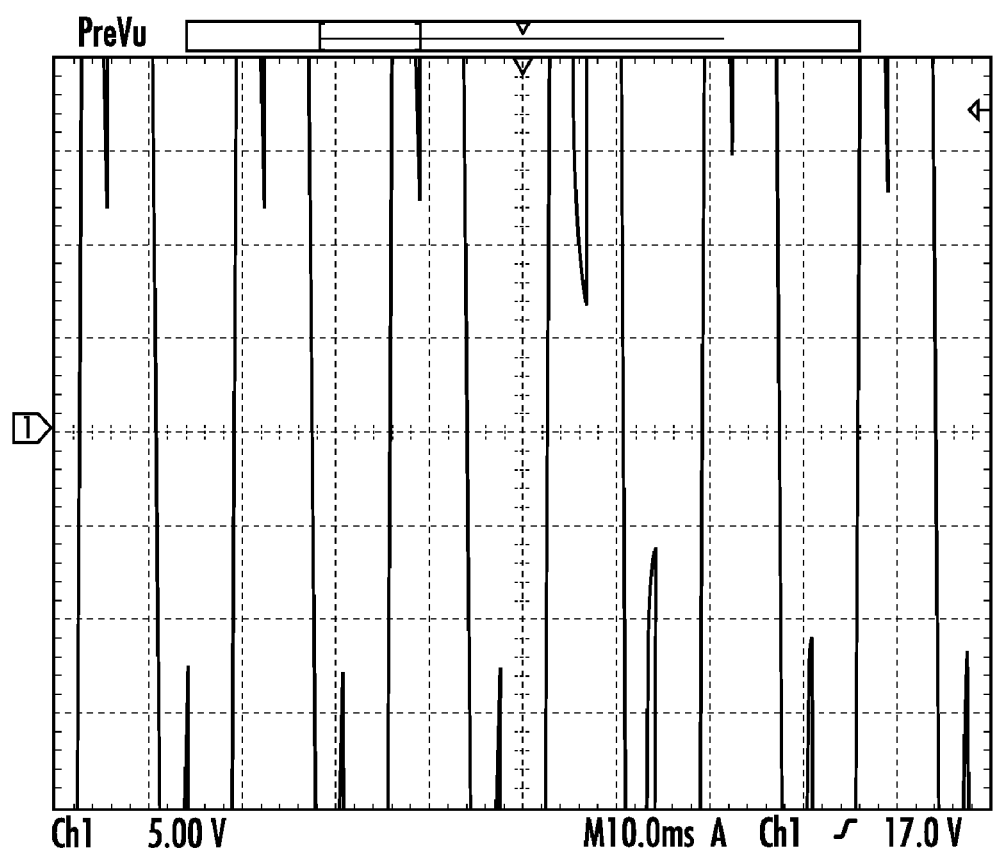
FIG. 7 is a screen shot illustrating a stalled motor reading on low speed according to an embodiment of the invention.

With reference to FIG. 7, an example of controlling an AC inductive motor operating at a slow speed mode in which the motor is stalled, according to an embodiment of the invention, will now be described. As shown in the screen shot of FIG. 7, the exemplary method senses the line crossing (i.e., the voltage crossing the zero line) and then physically cuts the power to the motor. The method takes an EMF reading or measurement approximately 4 ms after the voltage is cut and then turns the voltage to the motor back on. As shown in the embodiment of FIG. 7, the EMF reading for this example is approximately 7.5 V at a point of time approximately 4 ms after the voltage is cut.

Figure 8:
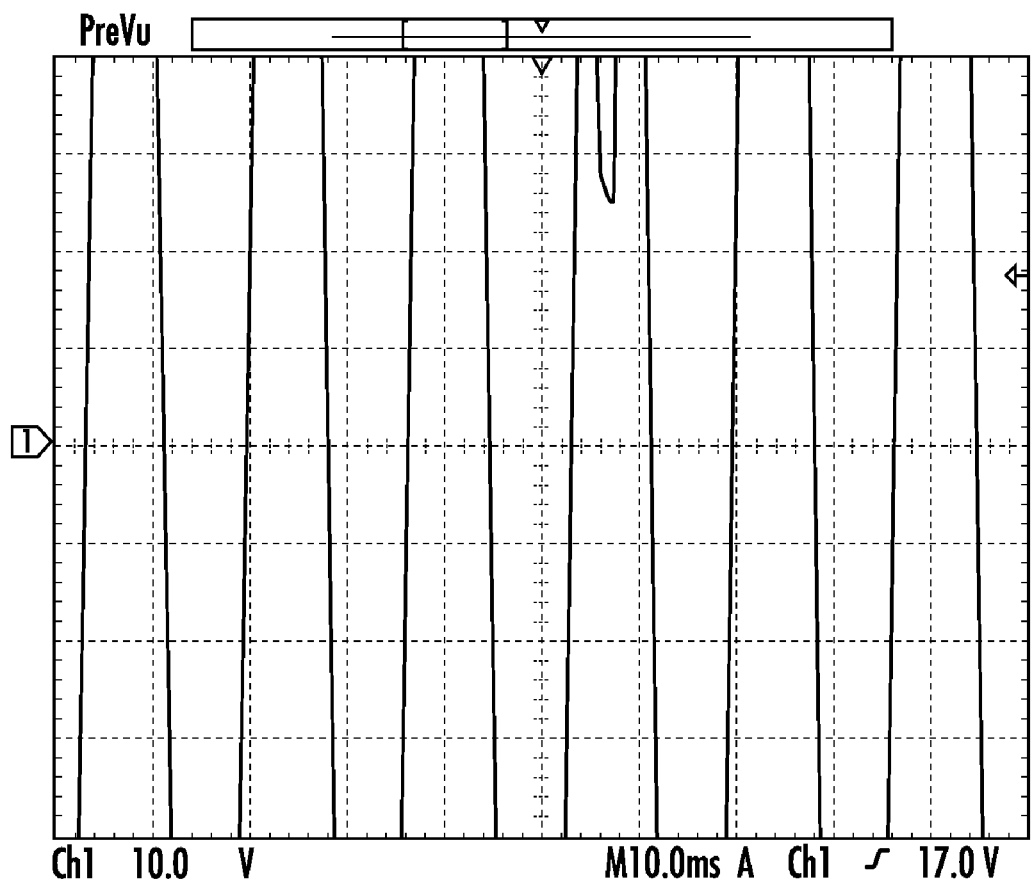
FIG. 8 is a screen shot illustrating a high speed reading according to an embodiment of the invention.

With reference to FIG. 8, an example of controlling an AC inductive motor operating at a high speed mode, according to an embodiment of the invention, will now be described. As shown in the screen shot of FIG. 8, the high speed setting may be provided by powering the motor in a full power or all-on state. The exemplary method senses the line crossing (i.e., the voltage crossing the zero line) and then physically cuts the power to the motor. The method takes an EMF reading or measurement approximately 4 ms after the voltage is cut and then turns the voltage to the motor back on. As shown in the embodiment of FIG. 8, the EMF reading for this example is approximately 25 V at a point of time approximately 4 ms after the voltage is cut.

Figure 9:
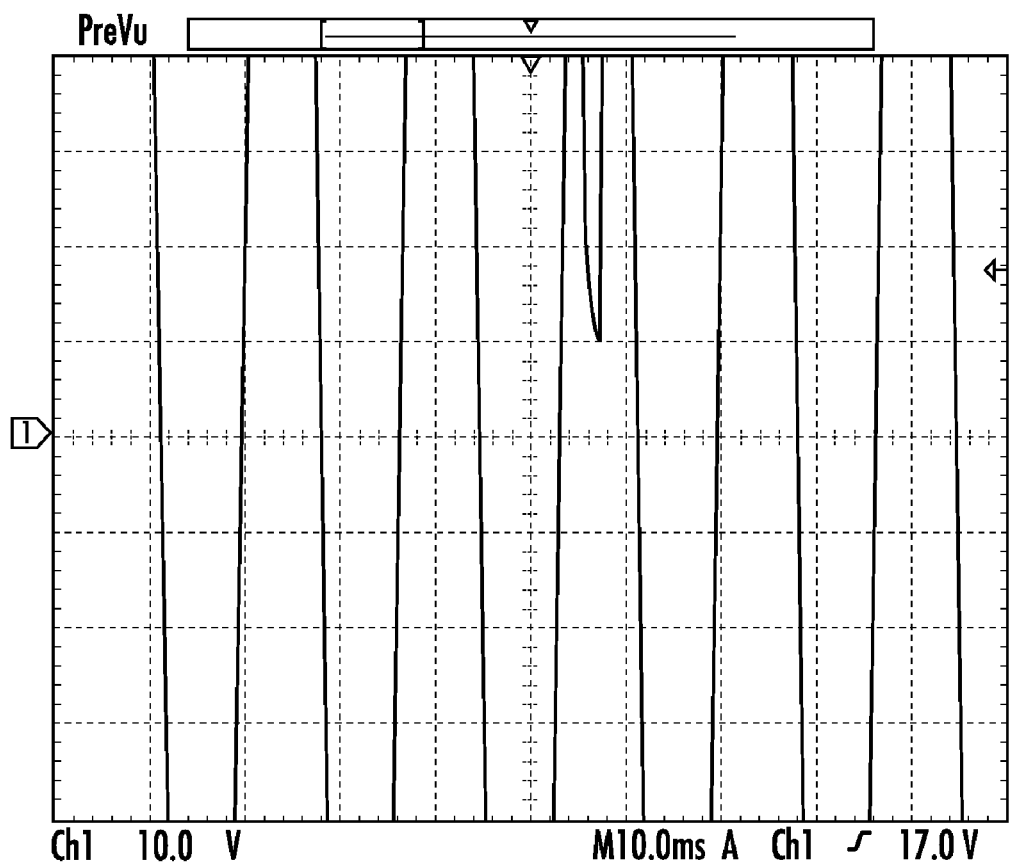
FIG. 9 is a screen shot illustrating a stalled motor reading on high speed according to an embodiment of the invention.

With reference to FIG. 9, an example of controlling an AC inductive motor operating at a high speed mode in which the motor is stalled, according to an embodiment of the invention, will now be described. As shown in the screen shot of FIG. 9, the exemplary method senses the line crossing (i.e., the voltage crossing the zero line) and then physically cuts the power to the motor. The method takes an EMF reading or measurement approximately 4 ms after the voltage is cut and then turns the voltage to the motor back on. As shown in the embodiment of FIG. 9, the EMF reading is approximately 10 V at a point of time approximately 4 ms after the voltage is cut.

Figure 10:
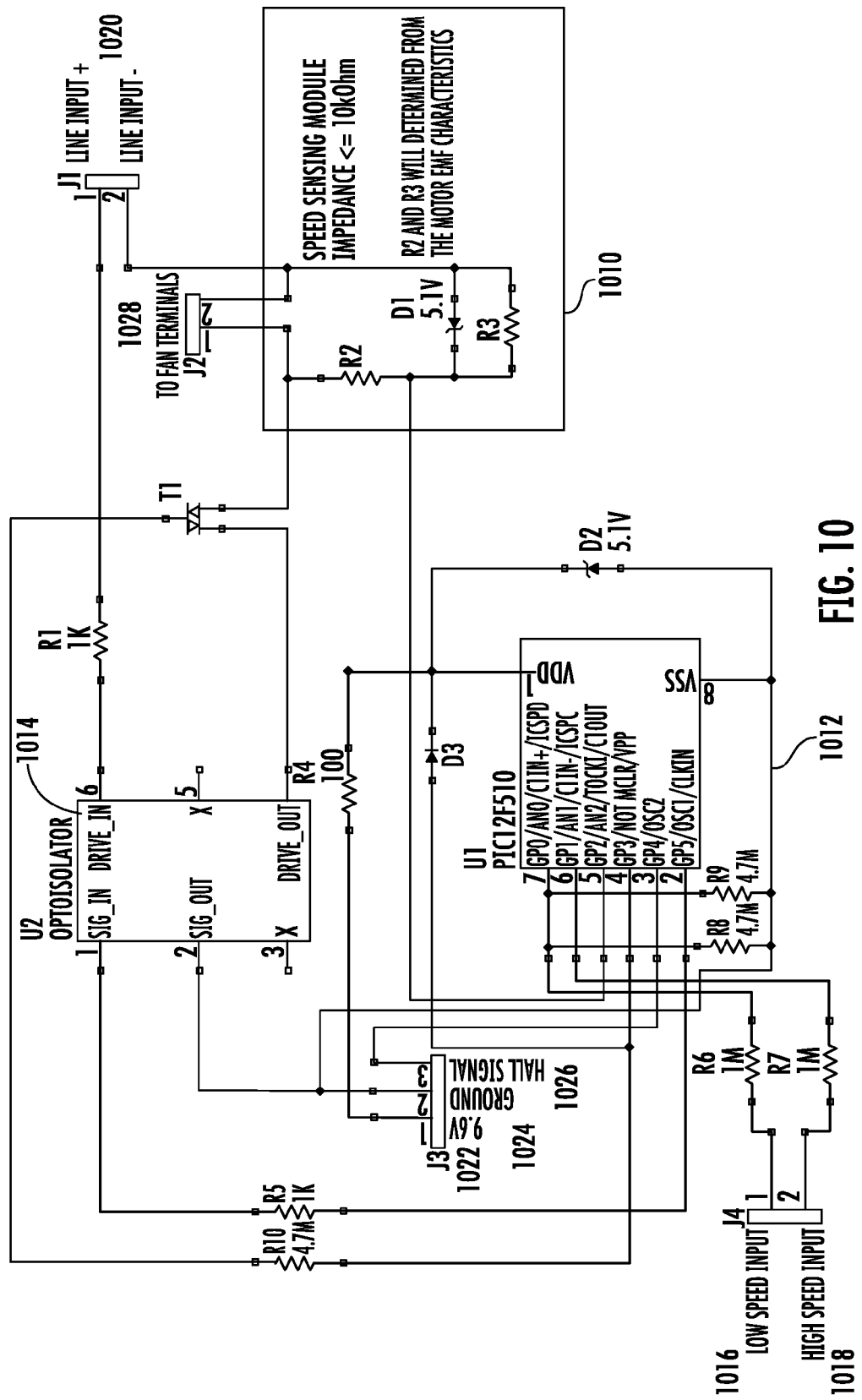
FIG. 10 is a schematic of a motor speed controller according to an embodiment of the invention.

With reference to FIG. 10, a schematic illustrating an exemplary embodiment of a motor speed controller for a fan will now be described. One of ordinary skill in the art will recognize that other arrangements of a motor speed controller, or means for performing the functionality of the motor speed controller described herein, can be implemented within the spirit and scope of the invention. The invention is not intended to be limited to the exemplary implementation shown in FIG. 10.

As shown in FIG. 10, the motor speed controller can include a low speed input 1016 and a high speed input 1018. The exemplary motor speed controller has a 120 V line input 1020, which may depend on the design, a 9.6 V input 1022, and a ground 1024. The exemplary motor speed controller has a Hall-signal output 1026 and a fan power output 1028. The embodiment of FIG. 10 includes a TRIAC (T1) 1030 coupled between an optoisolator 1014, the 120 V line input (power) and the fan power output 1028 (load).

As shown in FIG. 10, the motor speed controller includes a microcontroller 1012 and a speed sensing module 1010. The speed sensing module 1010 sends the measured EMF to the microcontroller 1012 for comparison with a look-up table (e.g., software look-up table).

In an embodiment, the measured EMF may be normalized to be within an operating range of the microcontroller 1012. That is, the EMF voltage can be normalized to solid state levels that can be read by the particular microcontroller and then sent to the microcontroller for comparison with the look-up table. For example, the resultant voltage magnitude of the measured EMF can be normalized to be within a 0 V to Vdd operating range of the microcontroller 1012. The speed sensing module 1010 reads a 25 V signal and normalizes the signal to 4.8 V so that the voltage signal can be read on a 5 V microcontroller 1012. The normalized voltage magnitude is then identified by the microcontroller 1012 and referenced to a software table to determine if the signal is outside the acceptable range of the fan and the fan is operating at an incorrect speed.

As shown in FIG. 10, an embodiment of the speed sensing module 1010 may include a flyback diode D1 to control inductive spiking. If the voltage spikes, the flashback diode D1 takes the flyback voltage and gives it a path to go away, which provides an important advantage of taking away or reducing the heat in the motor windings.

In an embodiment, the timing for the outputs of the microcontroller (e.g., 1012) may be derived directly from the power line crossings. To simplify the interface, an embodiment feeds the power line input through a >2.5 MΩ resistor. The internal microcontroller circuitry then sinks low voltage to ground and high voltage to Vdd, essentially creating a line crossing input signal.

One of ordinary skill in the art will recognize that other methods for synchronizing timing with the line source may be applied, and the embodiments are not limited to the example provided. For example, in an embodiment, the voltage to the motor may be cut at the zero line crossing (i.e., where waveform crosses the x-axis). In another embodiment, the timing scheme may be changed to measure the EMF at the peak of the waveform. That is, the voltage to the motor may be cut at the peak of the waveform, instead of the zero line crossing. In this embodiment, the line crossing may be sensed and the time to the peak of the waveform may be calculated based on the frequency. The embodiment may then measure the EMF at the peak of the waveform. As an example, if the frequency is 60 Hz, the signal is high for approximately 8.3 ms and low for approximately 8.3 ms. The peak is half of the high or low value, or approximately 4.17 ms. Accordingly, in this example, the voltage may be cut approximately 4.17 ms after the zero (0) line crossing. The EMF reading then can be taken after a predetermined amount of time (e.g., 4 ms following the cutting of the voltage, or 8.17 ms after the zero (0) line crossing), and then the voltage can be turned back on. The EMF reading can then be compared to a look-up table.

Figure 11:
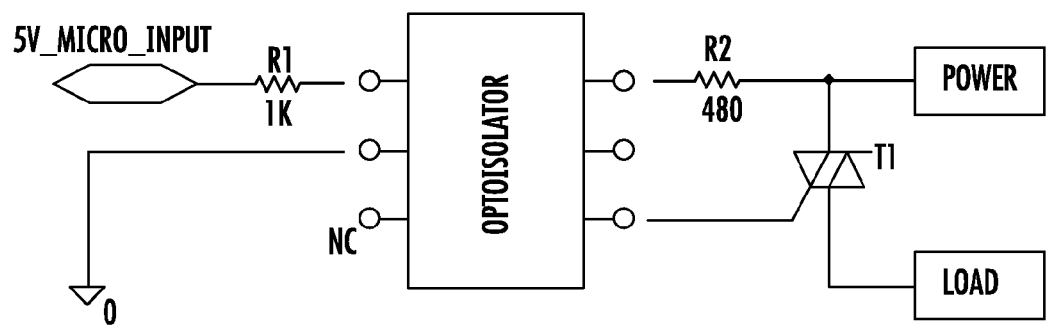
FIG. 11 is a schematic of a TRIAC control circuit according to an embodiment of the invention.
Figure 12:
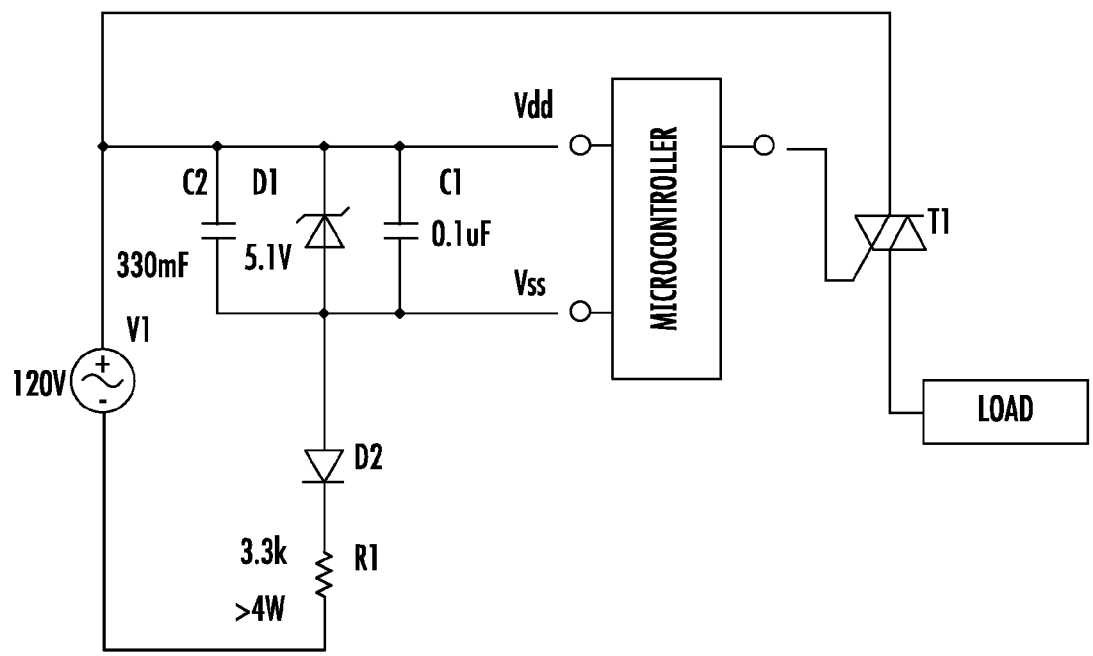
FIG. 12 is a schematic of a TRIAC control circuit according to an embodiment of the invention.

With reference to FIGS. 11 and 12, exemplary embodiments for controlling the speed of a motor, such as motor 104 or 240 in FIGS. 1 and 3, will now be described. As shown in FIGS. 11 and 12, the motor speed may be controlled via a TRIAC T1 (TRIode for Alternating Current) to pulse the power. One of ordinary skill in the art will recognize that the method of controlling the speed of the motor may be based on cost efficiency and various solutions may be implemented to pulse the power to the motor. For example, as illustrated in FIG. 11, the TRIAC T1 may be coupled between an optoisolator, the power source, and the load. As illustrated in FIG. 12, the TRIAC timing may be controlled by a microcontroller. FIG. 12 illustrates an embodiment having a power supply to the microcontroller with trade-offs for component numbers and values. In FIG. 12, no auxiliary power supply may be necessary for microcontroller operation. However, in other embodiments, the oven control system may have, for example, a 9.6 V regulated DC power supply.

Figure 13:
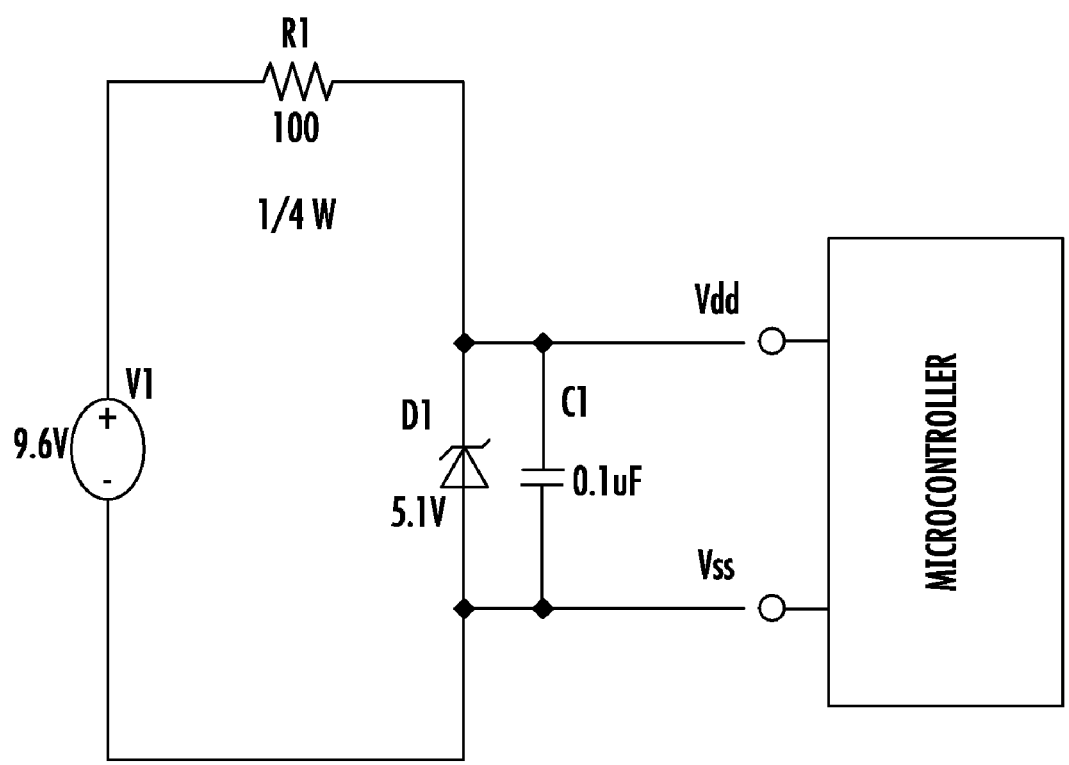
FIG. 13 is a schematic of a power supply circuit according to an embodiment of the invention.

FIG. 13 is a schematic illustrating a two component power supply that may be adequate or suitable for a fan motor of a household appliance, and more particularly, a household cooking appliance, such as a built-in wall oven. One of ordinary skill in the art will recognize that other power supply alternatives may be used.

Exemplary embodiments can provide safeguards for safe and continuous operation of the motor. For example, in an embodiment, a watchdog timer may be implemented to prevent unplanned infinite looping or other failures of the microcontroller. Upon timing out, the microcontroller may continue normal operation, if possible. In an embodiment, the system may be configured such that any failure, whether from the motor speed dropping below a minimum threshold or an undetermined failure, defaults the motor to a high speed operation. The embodiments may be effective for reducing or preventing problems associated with a runaway situation, for example, in which secondary devices interacting with, or depending on, the proper operation of the motor are powered on. For example, the embodiments may be effective for reducing or preventing problems associated with a runaway situation in which all heating elements in a cooking appliance are powered on and the cooking appliance relies on the motor to power a cooling or ventilating fan to maintain the temperature or reduce a build-up of heat in the cooking appliance and/or the surroundings of the cooking appliance.

As explained above, the exemplary embodiments of the invention provide an inexpensive and sensorless AC inductive motor control (e.g., AC single-phase or shaded-pole motor) that dynamically controls the speed of the motor and improves the safety of a device that depends on the motor for proper operation. The exemplary embodiments of the present invention can detect a failure or slowing of the motor below a predetermined or threshold speed. The exemplary embodiments of the invention can provide important advantages in improving the safety of such a device by running the motor at a high speed setting and/or turning off the heating elements (e.g., of a cooking appliance) to reduce a build-up of heat in the appliance and/or the surroundings of the appliance. The embodiments of the present invention also can provide a household appliance having a two speed motor that is inexpensive and easy to monitor and control.

The embodiments are described in general with respect to a motor control, a motor control for a household appliance such as a cooking appliance, and a motor control for a pulley drive. However, one of ordinary skill in the art will recognize that the embodiments are not limited to these examples and may include any device that incorporates a motor. For example, the embodiments are applicable to any household appliance having a fan, such as a wall oven, range/oven, convection oven, cooktop, or similar household appliance. The embodiments also are applicable to other household appliances or devices, such as a space heater, an air vent (e.g., exhaust vent or bathroom vent), a cabinet cooling fan for a personal computer, a laptop, a portable computing device, a server cabinet, etc., as well as microwaves, refrigerators, dishwashers, dryers, washing machines, etc. The embodiments also can provide for sensing a motor speed for a pulley drive, for example, in a household appliance, such as a washing machine. The embodiments can provide for sensing a motor speed for a rack and pinion drive or other translational mechanisms or devices.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor or microcontroller such that the processor or microcontroller can read information from, and write information to, the storage medium. In the alternative, the storage medium may be integral to the processor or microcontroller.

Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of controlling a motor, the method comprising:
   intentionally cutting a voltage to the motor;
   measuring an electromotive force (EMF) of the motor at a predetermined time after the intentionally cutting of the voltage to the motor; and
   comparing the measured electromotive force (EMF) to a table,
   wherein the motor is an AC single phase inductive motor.

2. The method according to claim 1, wherein the table is a software table or database.

3. The method according to claim 1, wherein the table is specific to the motor being used.

4. The method according to claim 1, wherein the table includes a threshold value.

5. A method of controlling a motor, the method comprising:
   intentionally cutting a voltage to the motor;
   measuring an electromotive force (EMF) of the motor at a predetermined time after the intentionally cutting of the voltage to the motor; and
   comparing the measured electromotive force (EMF) to a table,
   wherein the table includes a threshold value,
   wherein the threshold value includes a first threshold for a high speed mode, and
   wherein the threshold value includes a second threshold for a low speed mode.

6. The method according to claim 4, wherein the threshold value is based on an application of the motor.

7. The method according to claim 1, further comprising:
   determining one of:

whether the motor was running at a time of the intentionally cutting of the voltage to the motor based on the comparison of the measured electromotive force (EMF) to the table,
a speed of the motor at a time of the intentionally cutting of the voltage to the motor based on the comparison of the measured electromotive force (EMF) to the table, and
whether the motor is operating below a predetermined or threshold value at a time of the intentionally cutting of the voltage to the motor based on the comparison of the measured electromotive force (EMF) to the table.

8. The method according to claim 7, further comprising:
outputting a first signal indicating that the motor is operating properly if the operation of the motor is determined to be equal to or greater than the predetermined or threshold value, and
outputting a second signal indicating that the motor is operating improperly if the operation of the motor is determined to be less than the predetermined or threshold value.

9. The method according to claim 8,
wherein the first signal is a first Hall effect mimicking signal, and wherein the second signal is a second Hall effect mimicking signal.

10. The method according to claim 8, further comprising:
turning the voltage to the motor back on based on the outputting of the first signal, and
sending a signal to default the motor to a high speed setting based on the outputting of the second signal.

11. The method according to claim 10, further comprising:
setting a timer upon turning the voltage to the motor back on based on the outputting of the first signal; and
intentionally re-cutting the voltage to the motor after the timer has expired.

12. The method according to claim 1, further comprising:
turning the voltage to the motor back on.

13. The method according to claim 12,
wherein the voltage is periodically cut and turned back on, and
wherein the electromotive force (EMF) is measured during periods when the voltage is intentionally cut.

14. The method according to claim 1,
wherein a microcontroller performs the comparing of the measured electromotive force (EMF) to the table, and
wherein the method includes normalizing the measured electromotive force (EMF) of the motor to be within an operating range of a microcontroller.

15. The method according to claim 1, further comprising:
powering the motor in a full-on state to provide a high speed mode; and
intentionally cutting a leading edge of a power signal to the motor to reduce an amount of on-time of the motor and provide a low speed mode.

16. A method of controlling a motor, the method comprising:
periodically intentionally cutting a voltage to the motor;
measuring an electromotive force (EMF) of the motor at a predetermined period of time after the intentionally cutting of the voltage to the motor; and
comparing the measured electromotive force (EMF) to a table to determine if the motor is operating properly,
wherein, if the motor is determined to be operating properly, the method includes outputting a first signal and turning the voltage to the motor back on, and
wherein, if the motor is determined to be operating improperly, the method includes outputting a second signal,
wherein the motor is an AC single phase inductive motor.

17. A sensorless motor speed controller system comprising:
a motor; and
a motor controller that monitors operation of the motor based on electromotive force (EMF) conditions of the motor at a predetermined time after an intentional cutting of a voltage to the motor,
wherein the motor is an AC single phase inductive motor.

18. The system according to claim 17,
wherein the motor controller cuts a voltage to the motor, measures an electromotive force (EMF) of the motor during a motor off time and at the predetermined time after the intentional cutting of the voltage to the motor, and compares the measured electromotive force (EMF) to a table, and
wherein the motor controller includes:
a speed sensing module that measures the electromotive force (EMF) of the motor;
a microcontroller that receives the measured electromotive force (EMF) from the speed sensing module and compares the measured electromotive force (EMF) to a table.

19. The system according to claim 18, wherein the speed sensing module normalizes the measured electromotive force (EMF) of the motor to be within an operating range of the microcontroller.

20. The system according to claim 17, wherein the motor controller determines one of whether the motor was running based on the electromotive force (EMF) conditions of the motor, a speed of the motor based on the electromotive force (EMF) conditions of the motor, and whether the motor was operating below a predetermined or threshold value based on the electromotive force (EMF) conditions of the motor.

21. The system according to claim 17,
wherein the motor controller outputs a first signal indicating that the motor is operating properly if the electromotive force (EMF) conditions of the motor are equal to or greater than a predetermined or threshold value, and
wherein the motor controller outputs a second signal indicating that the motor is operating improperly if the electromotive force (EMF) conditions of the motor are less than a predetermined or threshold value.

22. A sensorless motor speed controller that monitors operation of a motor based on electromotive force (EMF) conditions of the motor, the sensorless motor speed controller comprising:
a microcontroller that intentionally cuts a voltage to the motor; and
a speed sensing module that measures the electromotive force (EMF) of the motor at a predetermined time after the microcontroller intentionally cuts the voltage to the motor,
wherein the microcontroller receives the measured electromotive force (EMF) from the speed sensing module and compares the measured electromotive force (EMF) to a table,
wherein the motor is an AC single phase inductive motor.

23. The method of claim 1, further comprising:
measuring the predetermined time after the intentionally cutting of the voltage to the motor.

24. A method of controlling a motor, the method comprising:
periodically cutting a voltage to the motor;
measuring an electromotive force (EMF) of the motor at a predetermined period of time after the cutting of the voltage to the motor;

comparing the measured electromotive force (EMF) to a table to determine if the motor is operating properly, wherein, if the motor is determined to be operating properly, the method includes outputting a first signal and turning the voltage to the motor back on, and wherein, if the motor is determined to be operating improperly, the method includes outputting a second signal; and measuring the predetermined time after the cutting of the voltage to the motor, wherein the motor is an AC single phase inductive motor.

25. The system of claim 17, wherein the motor controller measures the predetermined time after the intentionally cutting of the voltage to the motor.

26. The sensorless motor speed controller of claim 22, wherein the microcontroller measures the predetermined time after the intentionally cutting of the voltage to the motor.

27. The method of claim 16, further comprising:
measuring the predetermined time after the intentionally cutting of the voltage to the motor.

28. A method of controlling a motor, the method comprising:
intentionally cutting a voltage to the motor;
measuring an electromotive force (EMF) of the motor at a predetermined time after the intentionally cutting of the voltage to the motor; and
comparing the measured electromotive force (EMF) to a table,
wherein the motor is an AC single phase inductive motor,
wherein the table is specific to the AC single phase inductive motor being used,
the method further comprising determining one of:
whether the AC single phase inductive motor was running at a time of the intentionally cutting of the voltage to the AC single phase inductive motor based on the comparison of the measured electromotive force (EMF) to the table,
a speed of the AC single phase inductive motor at a time of the intentionally cutting of the voltage to the AC single phase inductive motor based on the comparison of the measured electromotive force (EMF) to the table, and
whether the AC single phase inductive motor is operating below a predetermined or threshold value at a time of the intentionally cutting of the voltage to the AC single phase inductive motor based on the comparison of the measured electromotive force (EMF) to the table.

29. The method of claim 5, wherein the motor is an AC single phase inductive motor.

30. The method of claim 16, wherein the table includes a threshold value,
wherein the threshold value includes a first threshold for a high speed mode, and
wherein the threshold value includes a second threshold for a low speed mode.

31. The sensorless motor speed controller system of claim 18, wherein the table includes a threshold value,
wherein the threshold value includes a first threshold for a high speed mode of the motor, and
wherein the threshold value includes a second threshold for a low speed mode of the motor.

32. The sensorless motor speed controller system of claim 18, wherein the table includes a threshold value,
wherein the threshold value includes a first threshold for a high speed mode of the motor, and
wherein the threshold value includes a second threshold for a low speed mode of the motor.

33. The method of claim 24, wherein the table includes a threshold value,
wherein the threshold value includes a first threshold for a high speed mode, and
wherein the threshold value includes a second threshold for a low speed mode.

* * * * *